June 30, 1953 — M. NOLCOX — 2,644,148
AUTOMOBILE PASSING SIGNAL
Filed Feb. 6, 1951 — 2 Sheets-Sheet 1
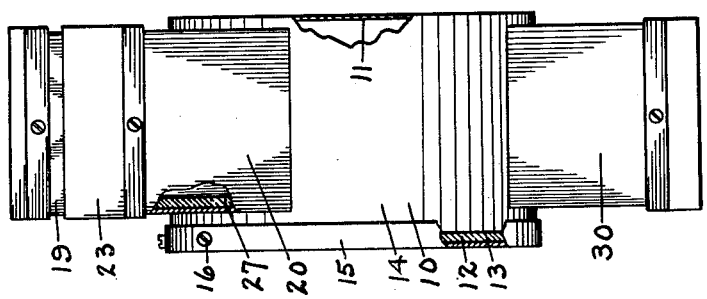
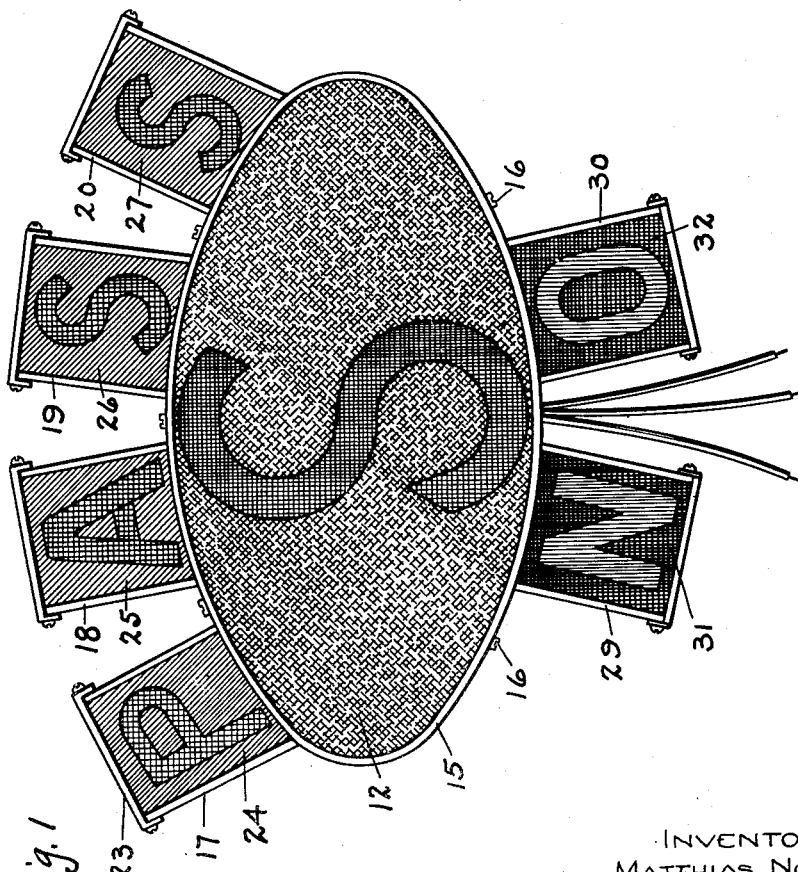
INVENTOR
MATTHIAS NOLCOX
By- Herbert A. Ventura
ATTORNEY June 30, 1953  M. NOLCOX  2,644,148
AUTOMOBILE PASSING SIGNAL
Filed Feb. 6, 1951  2 Sheets-Sheet 2
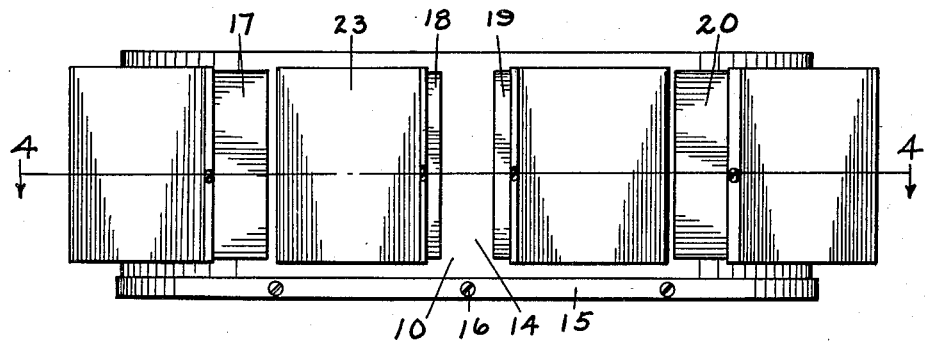
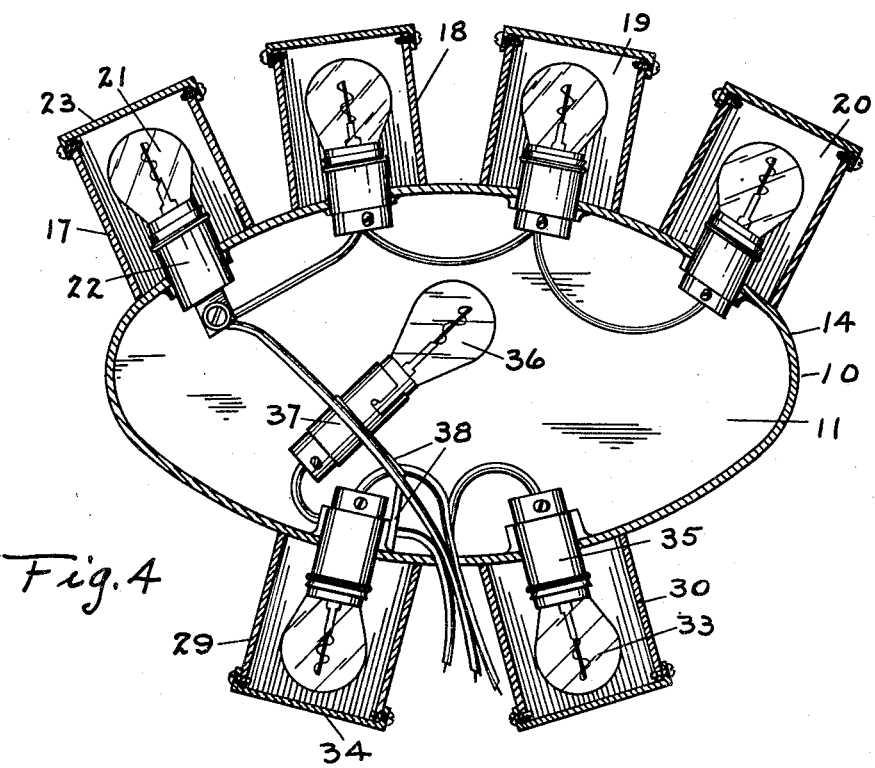
Fig. 4
INVENTOR
MATTHIAS NOLCOX
By—Herbert A. Minturn,
ATTORNEY Patented June 30, 1953

2,644,148

UNITED STATES PATENT OFFICE 2,644,148

AUTOMOBILE PASSING SIGNAL

Matthias Nolcox, Indianapolis, Ind.

Application February 6, 1951, Serial No. 209,603

3 Claims. (Cl. 340—106)

This invention relates to an electrically operated signal to be attached to the rear ends of automobiles, particularly trucks and busses, whereby another automobile approaching from the rear of the first automobile may be advised as to whether or not it is safe to pass the first automobile in respect to oncoming traffic.

The invention involves the forming of a signal device of the nature indicated which will be so striking in appearance that it will be certain to attract the notice of the driver approaching the vehicle carrying the signal, and also such that will display the intended signal such as "Pass" or "No" or a combination thereof, in such a manner that there can be no mistake as to the intention of the signal display. Further, the invention involves the mounting of individual lamp housings, each housing carrying a signal letter of a word to be displayed as the signal.

Further objects and advantages of the invention will become apparent to those versed in the art in the following description of one particular form of the invention as specifically defined by the appended claims, in reference to the accompany drawings, in which Fig. 1 is a view in rear elevation of a signal device embodying the invention;

Fig. 2 is a view in side elevation and partial section;

Fig. 3 is a view in top plan; and

Fig. 4 is a view in vertical transverse section on the line 4—4 in Fig. 3.

A generally elliptical body 10 is formed to have a solid front wall 11 which serves as a reflector. The rear wall 12 is made out of a generally transparent or at least translucent material, preferably glass, to be held in place by bearing around its marginal edge portion against the forward edge 13 of the encircling side wall 14, and to be secured in position by a moulding 15 engaging over the marginal edge of the wall 12 and also over the marginal edge of the front portion of the housing or body wall 14, and secured in place by any suitable means, herein shown as by screws 16.

On the top side of the wall 14, there is mounted a plurality of lamp housings, designated respectively by the numerals 17, 18, 19, and 20. The essential characteristics of each lamp housing is that it carry an illuminating lamp 21 and a rear enclosing wall which is transparent or at least translucent. To support the lamp 21 in each instance, there is provided a lamp base 22 secured to the wall 14 so as to present a lower portion of the base inside of the body 10 and have the other end of the base available within the housing so as to receive the lamp 21 replaceably therein. Access to the lamp 21 in each instance is had by removing the top wall 23 in each instance on each of the various housings 17, 18, 19, and 20.

The rear wall referred to is different in each housing in respect to the indicia carried thereon. Referring to Fig. 1, the housing 17 has a rear wall 24 which is green in color and carries thereon in any suitable manner the letter P. The housing 18 is provided with a green wall 25 and it carries thereon the letter A. The housing 19 wall 26 is green and carries the letter S. The housing 20 carries the rear wall 27, also green, and has the letter S thereon. Thus taking the four housings together, although they are separated by intervening spaces, the rear walls of the housing spell out the word PASS.

The rear wall 12 of the body 10 is made to be orange in color and carries thereon the letter S, substantially the entire height of the wall 12 and centrally disposed thereon. The letter S is preferably of a contrasting color with the orange color, herein shown to be black. Likewise the letters spelling out the word PASS are of contrasting color with the green walls, preferably being made to be black.

Depending from the underside of the wall 14 of the body 10 is a pair of housings 29 and 30, each carrying a rear wall that is opaque to transmission of light, but having thereon a translucent or transparent area in each instance. The wall 31 of the housing 29 has the letter N displayed thereon, the area of the wall 31 over which the N is displayed being the transparent portion. In like manner, the rear wall 32 of the housing 30 carries the letter O thereon, the area of the letter being transparent. Each of these lower housings 29 and 30 carries a lamp 33 therein accessible through the outer end of the housing by removing the bottom or cap wall 34. The lamps 33 in each instance are carried by a base or socket 35 which is supported to extend through the wall 14 so as to be available on the inside of the body 10 for electrical connections, and to extend into each housing respectively to take the lamp 33 therein.

Within the body 10 there is carried a lamp 36 substantially centrally disposed within that body, by being supported by a base 37 in turn fixed on a bracket 38 carried by the wall 14. This lamp 36 serves to illuminate the interior of the body 10, and hence to pass light through the wall 12, the orange colored wall as above described. All of the lamps 21, 33, and 36 are suitably electrically connected in circuits which may be controlled from the position of the operator of the automobile carrying the signal so that, selectively, the interior of the body 10 may be illuminated so as to display the orange color to the oncoming driver as a caution signal, the letter S in its black color standing out very dominately on that orange wall. The lamps 23 are also controllable so that all four are simultaneously illuminated in accordance with the traffic condition observed by the driver of the automobile, carrying the signal. Likewise the lamps 33 may be simultaneously illuminated to give the "No" signal indicating no passing. The controls may be varied at will so as to illuminate the lamps 23 and 33 simultaneously if desired, or one group at a time. Normally the illumination of the rear wall 12 would be discontinued at the time either one or both of the sets of lamps 23 and 33 are energized. It is to be noted that these housings 17, 18, 19, and 20 are spaced apart and are not in parallel alignment, but in approximately a radial alignment with considerable space intervening between adjacent housings. These individual housings are also centered on the vertical axis through the body 10, and likewise the lower housings 29 and 30 are likewise centered. The lower housings 29 and 30 are spaced apart so that they stand out very distinctively to be individual housings. Not only does this spacing of the housings promote an external appearance which will attract the attention of the oncoming driver by the very uniqueness of that construction, but by so spacing the housings the letters will not tend to be blurred one with the other, but will stand out individually so as to spell out the intended signal. With no energization of any of the lamps, the signal will not be ordinarily readable except by very close inspection, by reason of the selection of the colors of the rear walls of the various housings and the body itself, and also the colors of the letters appearing therein. Obviously the signal may be inverted to have the two separate housings on the underside and the four housings on the upper side reversed likewise so that in that instance, the word NO would appear on the top side and the word PASS would appear on the underside, the latters being turned in proper relation for that display. In either event, the individual spacing of the separate housings is maintained.

The signal may be attached to the vehicle in any suitable manner, such as by brackets, these brackets or mounting devices not being shown herein since they do not constitute a part of the invention per se.

In any event, the signal will be so displayed on the vehicle that its rear side will be readily observable by any oncoming vehicle therebehind so that the first vehicle may give to the oncoming vehicle the signals required to promote safety on the highway, so as to prevent the oncoming vehicle from assuming that the highway is clear to the left of the vehicle ahead when as a matter of fact, the first vehicle driver may observe an approaching not within the line of vision of the second vehicle behind. This is frequently the case in hilly country, or where the vehicles are traversing curves.

As indicated in Fig. 4, each of the housings 17, 18, 19, 20, 29, and 30, are mounted on the outside of the wall 14, so that the housing in each instance is entirely closed off across its side adjacent the wall 14 in order to prevent any illumination of the individual housing by the lamp 36 within the body 10. This insures no cross-illumination from anyone lamp to another. Also it is to be noted that even though one of the lamps 21 may be burned out or is not illuminated for any reason, the display still is "green" and the other letters are made available, so that the "safe" display is made in any event, since green is the generally acceptable go-ahead signal. Likewise should one of the lamps 33 be not illuminated, when intended to be illuminated, the other housing will display the red signal through its letter giving the generally recognized signal of stop, or at least do not proceed. The front wall 11 serves as a reflector within the body 10 in respect to the lamp 36, whereas the three walls in each of the respective housings serve as reflectors so that light therefrom is made apparent only through the rear walls of those housings.

Therefore it is to be seen that I have provided an extremely unique signal for the purposes intended, and while I have described the invention in the one particular form in more or less minute detail, it is obvious that structural changes may be employed without departing from the spirit of the invention, and I therefore do not desire to be limited to that precise form beyond the limitations which may be imposed by the following claims.

I claim:

1. A signal lamp comprising a lamp housing having a relatively rear translucent caution color enclosing wall; an encircling side wall about said lamp housing; a plurality of individual lamp housings mounted in two groups around said wall in spaced relation one from another, one of said groups of the housings carrying a "pass" signal colored rear wall in each housing, and the other group carrying a "no" signal colored rear wall in each housing; a lamp in each of all of said housings; said housings each being entirely closed off in respect to all other of said housings; and the illumination of one lamp being non-mixing with that of any other lamp; the said "paths," "go," and "caution" walls being differently colored one from the other.

2. A signal lamp comprising a lamp housing having a relatively rear translucent caution color enclosing wall; an encircling side wall about said lamp housing; a plurality of individual lamp housings mounted in two groups around said wall in spaced relation one from another, one of said groups of the housings carrying a "pass" signal colored rear wall in each housing, and the other group carrying a "no" signal colored rear wall in each housing; a lamp in each of all of said housings; said housings each being entirely closed off in respect to all other of said housings; and the illumination of one lamp being non-mixing with that of any other lamp; the said "paths," "go," and "caution" walls being differently colored one from the other; said lamp housing wall being generally elliptical; and said individual housings extending approximately radially from said lamp housing wall to be spaced farther apart at their outer ends than at their ends on said lamp housing wall.

3. A signal lamp comprising a lamp housing having a relatively rear translucent caution color enclosing wall; an encircling side wall about said lamp housing; a plurality of individual lamp housings mounted in two groups around said wall in spaced relation one from another, one of said groups of the housings carrying a "pass" signal colored rear wall in each housing, and the other group carrying a "no" signal colored rear wall in each housing; a lamp in each of all of said housings; said housings each being entirely closed off in respect to all other of said housings; and the illumination of one lamp being non-mixing with that of any other lamp; the said "paths," "go," and "caution" walls being differently colored one from the other; said lamp housing wall being generally elliptical; and said individual housings extending approximately radially from said lamp housing wall to be spaced farther apart at their outer ends than at their ends on said lamp housing wall; all of said signal housing and lamp housing walls carrying indicia thereon, said lamp housing wall greatly exceeding in area the individual areas of said housing rear walls, whereby the lamp housing wall dominates in size said signal housing walls.

MATTHIAS NOLCOX.

References Cited in the file of this patent

UNITED STATES PATENTS

| Number | Name | Date |
|---|---|---|
| 2,044,300 | Heans | June 16, 1936 |
| 2,400,655 | Saia | May 21, 1946 |
| 2,464,535 | Smith, Jr. | Mar. 15, 1949 |
| 2,467,841 | Marinos | Apr. 19, 1949 |
| 2,503,336 | Hines | Apr. 11, 1950 |